United States Patent
Coleman

(10) Patent No.: US 8,532,419 B2
(45) Date of Patent: Sep. 10, 2013

(54) AUTOMATIC IMAGE CAPTURE

(75) Inventor: Mike Reddick Coleman, Portland, OR (US)

(73) Assignee: iParse, LLC, Beaverton, OR (US)

( * ) Notice: Subject to any disclaimer, the term of this patent is extended or adjusted under 35 U.S.C. 154(b) by 323 days.

(21) Appl. No.: 12/930,630

(22) Filed: Jan. 12, 2011

(65) Prior Publication Data

US 2011/0170740 A1 Jul. 14, 2011

Related U.S. Application Data

(60) Provisional application No. 61/335,875, filed on Jan. 13, 2010.

(51) Int. Cl.
*G06K 9/40* (2006.01)
*G06K 9/00* (2006.01)

(52) U.S. Cl.
USPC .............................. 382/254; 382/137; 705/45

(58) Field of Classification Search
USPC ................. 382/103, 137, 294, 174–276, 305, 382/312; 705/45, 42; 235/379; 455/556.1; 348/207.99, 222.1
See application file for complete search history.

(56) References Cited

U.S. PATENT DOCUMENTS

| | | | | |
|---|---|---|---|---|
| 5,537,483 A | * | 7/1996 | Stapleton et al. | 382/309 |
| 7,373,173 B2 | * | 5/2008 | Brittan et al. | 455/556.1 |
| 7,680,739 B1 | * | 3/2010 | Venturo et al. | 705/45 |
| 7,885,451 B1 | * | 2/2011 | Walls et al. | 382/137 |
| 8,000,514 B2 | * | 8/2011 | Nepomniachtchi et al. | 382/137 |
| 8,235,284 B1 | * | 8/2012 | Prasad et al. | 235/379 |

* cited by examiner

*Primary Examiner* — Kanjibhai Patel
(74) *Attorney, Agent, or Firm* — Francis I. Gray

(57) ABSTRACT

A method of automatically capturing images with precision uses an intelligent mobile device having a camera loaded with an appropriate image capture application. When a user initializes the application, the camera starts taking images of the object. Each image is qualified to determine whether it is in focus and entirely within the field of view of the camera. Two or more qualified images are captured and stored for subsequent processing. The qualified images are aligned with each other by an appropriate perspective transformation so they each fill a common frame. Averaging of the aligned images reduces noise and a sharpening filter enhances edges, which produces a sharper image. The processed image is then converted into a two-level, black and white image which may be presented to the user for approval prior to submission via wireless or WiFi to a remote location.

20 Claims, 2 Drawing Sheets

AUTOMATIC IMAGE CAPTURE

CROSS REFERENCE TO RELATED APPLICATIONS

The present application claims the benefit of the filing date of U.S. Provisional Patent Application Ser. No 61/335,875 that was filed on Jan. 13, 2010, which Provisional Patent Application is expressly abandoned upon the filing of the present non-provisional Patent Application.

BACKGROUND OF THE INVENTION

The present invention relates to image capture, and more particularly to a method for automatically capturing object images without human intervention for transmission to a remote location via an intelligent mobile device.

Conventional image capturing devices, such as cameras and scanners, typically require human or other external intelligence to select the appropriate image for a specific application. While this is sufficient for some image capture systems, many systems require very precise images for processing.

One such example is the new methodology being used by banking institutions for deposit of checks remotely via an intelligent mobile device, such as a wireless telephone, as exemplified by U.S. Pat. No. 7,778,457 entitled "Systems for Mobile Image Capture and Processing of Checks" by Grigori Nepomniachtchi et al and issued Aug. 17, 2010 and further shown in a video at http://www.youtube.com/watch?v=sGD49ybxS2Q. Another video of a method used by USAA Bank is shown at http://www.youtube.com/watch?v=waBQasSg2NM which describes the USAA Deposit@ Mobile system using an iPhone® mobile device. With this system an appropriate application is downloaded to the iPhone device once the user is qualified by USAA Bank. The user accesses the application on the iPhone device and enters the amount of the check. Then the user uses a camera which is part of the iPhone device to capture an image of both the front and back of the check by, for each instance, lining up the check to be captured within a rectangular graticule or frame on the iPhone viewing screen. Once the images are captured, the user is asked to verify the images and then submit the images to USAA Bank. The captured images of the check are then transmitted via Wireless or Win to USAA Bank. However it can be tedious and difficult for the user to properly align the image of the check within the rectangular graticule, and motion by the user in taking the picture often results in unusable images. Also in some instances the banking institution may require that the check still be sent to the bank as well since the captured image may not satisfy Federal Reserve Board standards regarding legal replacement checks.

What is desired is a method of automatically capturing images of objects, such as checks for deposit, using an intelligent mobile device that does not rely upon human intervention and that provides a precise image for transmission to a remote location.

BRIEF SUMMARY OF THE INVENTION

Accordingly the present invention provides a method of automatically capturing images with precision that does not require human intervention. An intelligent mobile device, such as a wireless phone, has an appropriate application, such as a check deposit application, downloaded and stored therein. When the user calls up the application and aims the camera of the mobile device at an object to be captured, the camera starts capturing images of the object. As each image is captured, it is qualified to determine whether it is in focus and entirely within the field of view of the camera. As an option, using an accelerometer that may be part of the intelligent mobile device, the amount of motion within each image may be determined. If the object is in focus, within the field of view, and optionally the motion is acceptable, the particular qualified image is stored for subsequent processing. Two or more qualified images may be taken automatically before further processing occurs. When sufficient qualified images of the object are captured, the images are aligned with each other by an appropriate perspective transformation so they each fill a common reference frame. Averaging of the images reduces noise and a sharpening filter enhances edges, which produces a sharper image. The processed image may then be converted into a two-level, black and white image which may be presented to the user for approval prior to submission via wireless or WiFi to a remote location, such as a banking institution in the case of the check deposit application.

The objects, advantages and other novel features of the present invention are apparent from the following detailed description when read in conjunction with the appended claims and attached drawing.

DETAILED DESCRIPTION OF THE INVENTION

Figure 1:
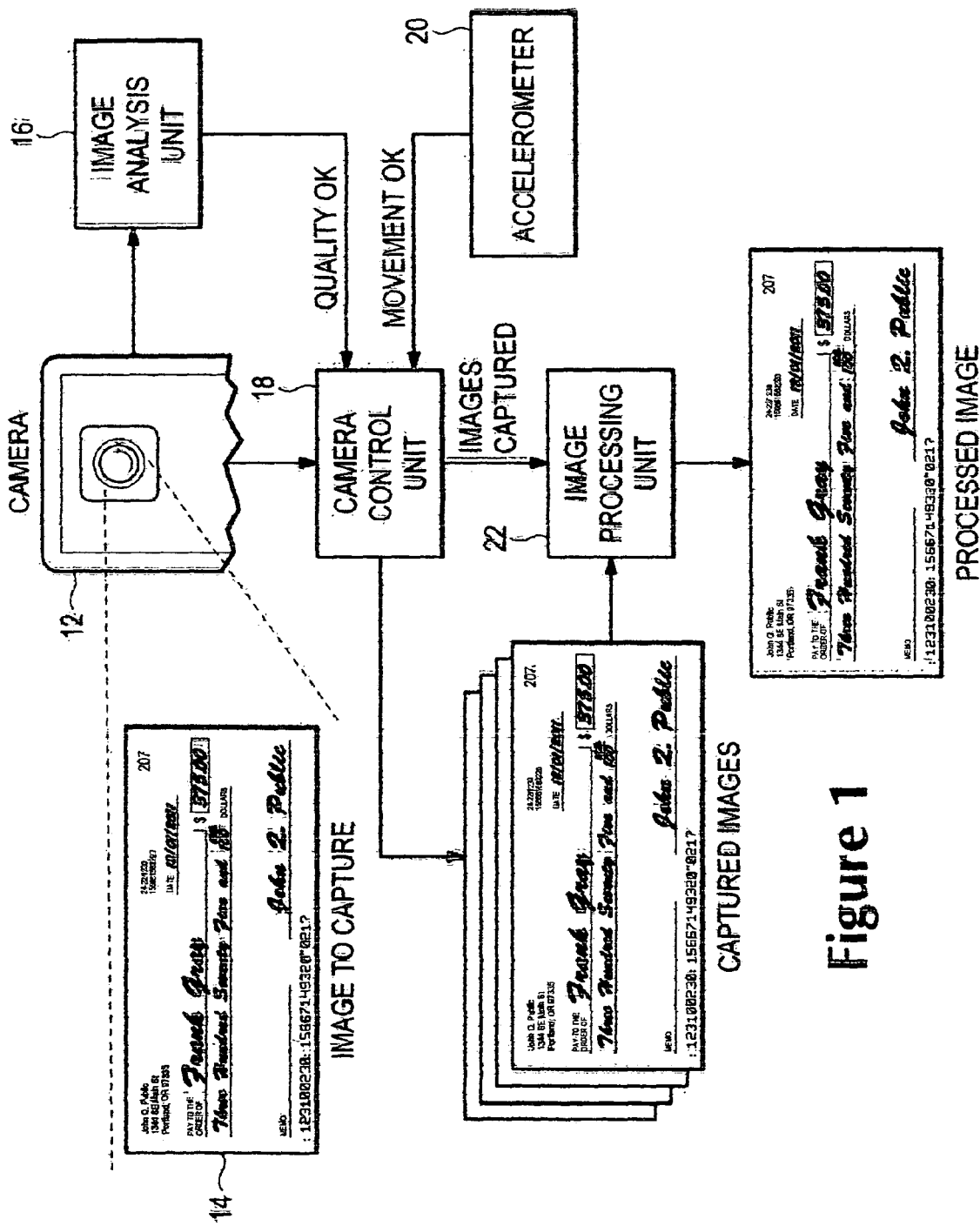
FIG. 1 is an overview of a method of automatically capturing images according to the present invention.
Figure 2:
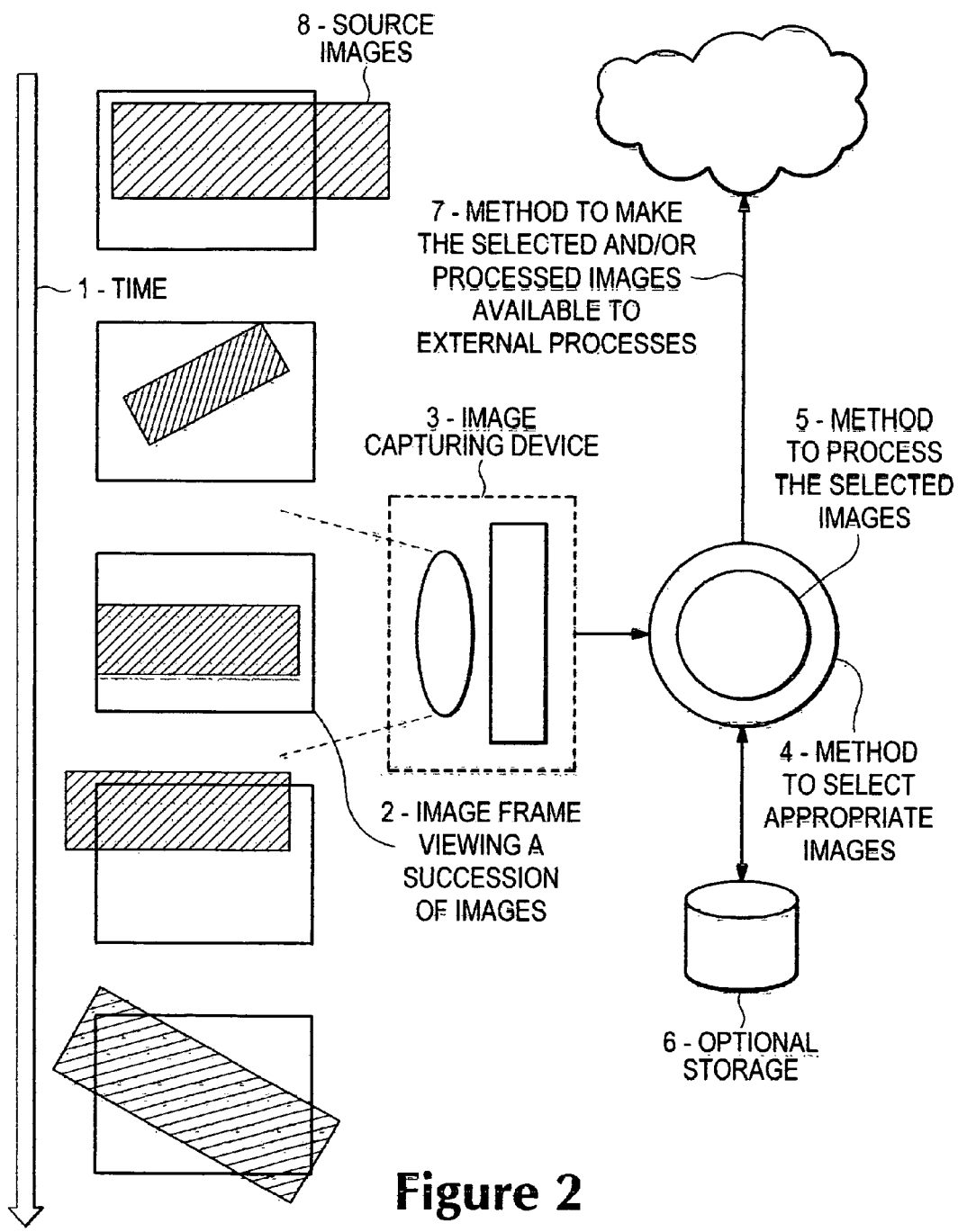
FIG. 2 is a system view of the method of automatically capturing images according to the present invention.

Referring now to FIG. 1 an intelligent mobile device, such as a wireless phone having a camera 12, is used to capture images of a desired object 14, such as a check for deposit. The user places the intelligent mobile device into a capture mode, which turns on the camera 12. The camera 12 automatically starts to take pictures of an object, such as the check, when the object is within its field of view. Since the general characteristics of the object are known, such as geometric shape, an image analysis unit 16, which is part of the capture mode, qualifies each picture as captured to determine whether the object is within the field of view and is of adequate quality, i.e., is in focus and within a desired image frame as indicated by a graticule on the camera display, As shown in FIG. 2, there are instances where the object is outside the field of view, and so are not recognized and captured by the camera 12. Only in this example is the middle image in time qualified for storage. If the quality is adequate, the image analysis unit 16 sends the information to a camera control unit 18 to indicate that the particular image is qualified.

Also included in the intelligent mobile device may be an accelerometer 20 that detects motion of the device. Excessive motion may cause blurring of the image, so the camera control unit 18 stores the image of the object 14 only if the amount of motion is acceptable. The excessive motion feature may not be necessary, but may be made available if needed. At least two, and preferably more, qualified images may be captured automatically in this manner in real time, the number depending upon the environment—amount of motion, lighting, etc. Once the requisite number of qualified images of the object 14 is stored, the camera 12 stops taking pictures and the stored images are input to an image processing unit 22. The captured images may be RGB high resolution images.

The image processing unit 22 takes each captured image and performs a quick focus and framing test. Captured images that fail the quick focus and framing test are deleted. Then motion-compensated averaging of the captured images may be applied to reduce noise, if necessary. From this a single grey-scale output channel is created using a heuristic, choosing either the green channel or some combination depending upon the object background and other characteristics, such as the writing on a check. The grey-scale image is squared using a perspective transformation into a two-dimensional image that completely fills the desired frame. A sharpening filter may be used to enhance edges of the details of the object 14, such as writing, bank codes, etc. that appear on checks. Then adaptive thresholding is applied to produce a two-level, black and white, image. The resulting binary rectangular processed image may be presented to a user.

For banking transactions the above process is repeated for the back of the check, and the resulting processed images conform to the desired Federal Reserve Board standard to qualify as a legal replacement check. Thus there is no requirement to additionally mail the check to the bank to complete the deposit process. The result is that the check images are captured automatically without human intervention, which increases the probability that they will turn out to be of adequate quality. Multiple images allow for noise reduction, which increases the quality of the processed images, especially when lighting is poor. Also image skew presents less of a problem since the captured images are transformed into the desired rectangular image, i.e., are frame aligned.

To further automate the processing of checks, an optical scan recognition (OCR) system may used to read the bank code/routing numbers on the bottom of the check and convert them into a data file to go along with the check image. Further character recognition procedures may be used to recognize data in other fields of the check, such as date, amount, payee and signature. Although these further recognition procedures may be more difficult, the recognized data may be presented to the user for correction prior to transmission from the intelligent wireless phone to the bank. Additional processing may be used, such as contrast enhancement, etc., to further enhance the processed image. In other words, any processing that improves the processed image may be used once the qualified images are captured and stored.

Thus the present invention provides a method of automatically capturing an image of an object without human intervention using an intelligent mobile device having a camera feature by automatically capturing images of a desired object, such as a check, qualifying each image until a desired number of qualified images are captured and stored, processing the qualified images using noise reduction and image enhancement techniques to produce a processed image for the desired object, and then transmitting the processed image to a remote location, such as a bank for a check deposit application.

What is claimed is:

1. A method of automatic image capture of a desired object using a mobile device having a camera comprising the steps of:
    enabling an image capture application on the mobile device;
    automatically capturing images of the desired object by the camera when the desired image is detected as being within a camera frame to produce captured images;
    qualifying each captured image according to specified criteria to produce qualified images that satisfy the specified criteria;
    storing each qualified image on the mobile device; and
    stopping the automatic capturing of images when a predetermined number of qualified images are stored.

2. The method as recited in claim 1 wherein the specified criteria comprise the desired object being in focus and within the camera field of view.

3. The method as recited in claim 1 further comprising the steps of:
    processing the stored qualified images to produce an enhanced image of the desired object; and
    transmitting the enhanced image to a remote location.

4. The method as recited in claim 3 wherein the processing step comprises the step of aligning each of the stored qualified images to be within a common frame.

5. The method as recited in claim 4 wherein the aligning step comprises the step of performing a perspective transformation from a three-dimensional image to a two-dimensional image for the stored qualified images so the stored qualified images are within the common frame.

6. The method as recited in claim 4 wherein the processing step further comprises the step of sharpness filtering the stored qualified images to produce sharpened images as the stored qualified images.

7. The method as recited in claim 6 wherein the processing step further comprises the step of averaging the stored qualified images to reduce noise and produce an averaged image as the enhanced image.

8. The method as recited in claim 4 wherein the processing step further comprises the step of averaging the stored qualified images to reduce noise and produce an averaged image as the enhanced image.

9. The method as recited in claim 8 wherein the processing step further comprises the step of sharpness filtering the averaged image from the averaging step to produce the enhanced image.

10. The method as recited in claim 3 wherein the processing step comprises the step of converting the enhanced image to a binary image as the enhanced image for transmission in the transmitting step.

11. The method as recited in claim 10 wherein the converting step comprises the step of applying adaptive thresholding to the enhanced image to produce the binary image.

12. The method as recited in claim 3 wherein the processing step comprises the step of using optical character recognition to read information printed on the desired object to form a data file for transmission with the enhanced image in the transmitting step.

13. The method as recited in claim 3 wherein the processing step comprises the step of using a character recognition algorithm to read information on the desired object to form a data file for transmission with the enhanced image in the transmitting step.

14. The method as recited in claim 8 wherein the processing step further comprises the step of contrast enhancement of the enhanced image prior to the transmitting step.

15. The method as recited in 1 further comprising the step of determining an amount of motion in the captured images for use by the qualifying step.

16. The method as recited in claim 1 further comprising the step of displaying the enhanced image on the mobile device for review and correction, if necessary, by the user prior to the transmitting step.

17. The method as recited in claim 1 wherein the predetermined number comprises an adaptive number determined by environmental factors.

18. The method as recited in claim 17 wherein the environmental factors include lighting.

19. The method as recited in claim 15 wherein the predetermined number comprises an adaptive number determined by environmental factors.

20. The method as recited in claim 19 wherein the environmental factors include lighting and the amount of motion.

* * * * *